United States Patent
Yong et al.

(10) Patent No.: US 11,358,646 B2
(45) Date of Patent: Jun. 14, 2022

(54) VEHICLE BODY FORMING STRUCTURE AND VEHICLE BODY USING THE SAME

(71) Applicants: Hyundai Motor Company, Seoul (KR); Kia Motors Corporation, Seoul (KR)

(72) Inventors: Ji Ae Yong, Gangneung-si (KR); Sun Hyung Cho, Suwon-si (KR); Chui Hee Heo, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/928,346

(22) Filed: Jul. 14, 2020

(65) Prior Publication Data

US 2021/0171125 A1 Jun. 10, 2021

(30) Foreign Application Priority Data

Dec. 5, 2019 (KR) .......................... 10-2019-0160986

(51) Int. Cl.
| | | |
|---|---|---|
| *B62D 31/00* | (2006.01) | |
| *B62D 23/00* | (2006.01) | |
| *B62D 27/06* | (2006.01) | |
| *B62D 25/02* | (2006.01) | |
| *B62D 25/20* | (2006.01) | |
| *B62D 25/06* | (2006.01) | |
| *B62D 25/08* | (2006.01) | |
| *B62D 25/04* | (2006.01) | |

(52) U.S. Cl.
CPC .......... *B62D 23/005* (2013.01); *B62D 25/02* (2013.01); *B62D 25/04* (2013.01); *B62D 25/06* (2013.01); *B62D 25/081* (2013.01); *B62D 25/2009* (2013.01); *B62D 27/06* (2013.01); *B62D 31/003* (2013.01)

(58) Field of Classification Search
CPC ...... B62D 23/00; B62D 23/005; B62D 27/06; B62D 27/065; B62D 31/003
USPC ......................................................... 296/205
See application file for complete search history.

(56) References Cited

U.S. PATENT DOCUMENTS

| | | | |
|---|---|---|---|
| 4,325,448 | A | 4/1982 | Pivar |
| 4,660,345 | A | 4/1987 | Browning |
| 5,209,541 | A | 5/1993 | Janotik |
| 5,332,281 | A | 7/1994 | Janotik et al. |
| 5,549,352 | A | 8/1996 | Janotik et al. |
| 5,829,219 | A | 11/1998 | Sugawara et al. |
| 6,022,070 | A | 2/2000 | Ashina et al. |
| 6,042,163 | A | 3/2000 | Reiffer |

(Continued)

FOREIGN PATENT DOCUMENTS

| | | | | |
|---|---|---|---|---|
| DE | 102005026791 A1 | * | 1/2007 | ........... B62D 23/005 |
| EP | 1329374 A1 | | 7/2003 | |

(Continued)

*Primary Examiner* — Dennis H Pedder
(74) *Attorney, Agent, or Firm* — Slater Matsil, LLP

(57) ABSTRACT

A vehicle body forming structure is provided. The vehicle body forming structure includes a plurality of linear members each including a bent portion in at least a portion thereof, wherein the plurality of linear members overlap each other in at least a partial section to form overlapping extending portions extending in a same direction, and a fastening member configured to fasten the overlapping extending portions to form a vehicle body frame.

11 Claims, 4 Drawing Sheets

(56) References Cited

U.S. PATENT DOCUMENTS

| | | | |
|---|---|---|---|
| 6,099,084 A | 8/2000 | Bungarten et al. | |
| 6,241,310 B1 | 6/2001 | Patelczyk | |
| 6,318,775 B1 | 11/2001 | Heatherington et al. | |
| 6,695,368 B1 | 2/2004 | Weykamp et al. | |
| 6,869,136 B2 | 3/2005 | Igarashi et al. | |
| 6,926,350 B2 | 8/2005 | Gabbianelli et al. | |
| 7,001,097 B2 | 2/2006 | Wang et al. | |
| 7,386,938 B2 | 6/2008 | Bruggemann et al. | |
| 7,758,107 B2 * | 7/2010 | Ratsos | B62D 25/06 |
| | | | 296/203.03 |
| 8,371,642 B2 | 2/2013 | Baccouche et al. | |
| 8,640,814 B2 | 2/2014 | Deckard et al. | |
| 9,505,293 B2 | 11/2016 | Bowles et al. | |
| 9,849,920 B2 | 12/2017 | Kawata et al. | |
| 10,618,489 B2 | 4/2020 | Hisamura et al. | |
| 10,686,304 B2 | 6/2020 | Wagner, III | |
| 2001/0000119 A1 | 4/2001 | Jaekel et al. | |
| 2006/0059807 A1 | 3/2006 | Zimmerman et al. | |
| 2006/0192375 A1 | 8/2006 | Davis et al. | |
| 2009/0121106 A1 | 5/2009 | An | |
| 2013/0277137 A1 | 10/2013 | Kawaguchi et al. | |
| 2015/0252586 A1 | 9/2015 | Schaefer | |
| 2015/0259011 A1 | 9/2015 | Deckard et al. | |
| 2015/0298739 A1 | 10/2015 | Buschjohann et al. | |
| 2017/0136874 A1 | 5/2017 | Harris et al. | |
| 2019/0208741 A1 | 7/2019 | Huthmaker et al. | |
| 2021/0171125 A1 | 6/2021 | Yong et al. | |

FOREIGN PATENT DOCUMENTS

| | | | | |
|---|---|---|---|---|
| FR | 2822431 A1 * | 9/2002 | | B62D 23/005 |
| GB | 2508075 A | 9/2013 | | |
| JP | H0411581 A | 1/1992 | | |
| JP | 2013208968 A | 10/2013 | | |
| KR | 100243584 B1 | 3/2000 | | |
| KR | 20090035148 A | 4/2009 | | |
| WO | WO-2010071664 A1 * | 6/2010 | | B62D 23/005 |

* cited by examiner

VEHICLE BODY FORMING STRUCTURE AND VEHICLE BODY USING THE SAME

CROSS-REFERENCE TO RELATED APPLICATIONS

This application claims priority to Korean Patent Application No. 10-2019-0160986, filed on Dec. 5, 2019, which application is hereby incorporated herein by reference.

TECHNICAL FIELD

The present disclosure relates to a structure for forming a vehicle body.

BACKGROUND

Recently, eco-friendly vehicles such as ultra-small electric vehicles have been actively developed and such ultra-small vehicles are suitable for small quantity batch production to meet various needs of consumers.

Therefore, a vehicle body structure which incurs a relatively low cost and saves investment cost for production, while realizing small quantity batch production, is required.

The contents described as the related art have been provided only to assist in understanding the background of the present disclosure and should not be considered as corresponding to the related art known to those having ordinary skill in the art.

SUMMARY

An embodiment of the present disclosure may provide a vehicle body forming structure which rarely needs processes requiring large investments, such as pressing, welding, painting, and the like, thus ensuring relatively high productivity, while incurring a relatively low cost and saving investment cost for production, and which has such high design freedom as to be more suitable for small quantity batch production, and a vehicle body using the same.

According to an embodiment of the present disclosure, there is provided a vehicle body forming structure in which a plurality of linear members each including a bent portion in at least a portion thereof to form different spaces overlap each other in at least a partial section to form overlapping extending portions extending in the same direction, and the overlapping extending portions of the linear members are fastened by a fastening member to form a vehicle body frame.

Three or more of the linear members which are at least partially adjacent to each other may have a spatial joint formed of a space in which none of the linear members overlap each other, between the overlapping extending portions formed therebetween.

The linear member may be formed of a hollow member in which at least a partial section forms a closed cross-section.

The linear member may be formed of a channel member having a C-shaped cross-section in which a portion is open.

The linear members may include a hollow member in which at least a partial section forms a closed cross-section and a channel member having a C-shaped cross-section in which a portion is open, and the hollow member and the channel member may be used in combination.

The fastening member may include a bolt or a screw fastened through two linear members forming the overlapping extending portion, and when the linear member is the hollow member, the fastening member may be inserted through a fastening hole formed at the hollow member so as to be fastened, and when the linear member is the channel member, the fastening member may be inserted through an opening so as to be fastened.

According to another embodiment of the present disclosure, a vehicle body includes side members formed of linear members forming side spaces of the vehicle body, a front glass member formed of a linear member forming an overlapping extending portion with the side members on both sides and forming a front windshield glass installation space, a rear glass member formed of a linear member forming the overlapping extending portion with the side members on both sides and forming a rear windshield glass installation space, and a roof member formed of a linear member forming the overlapping extending portion with the side members on both sides, forming the overlapping extending portion with the front glass member at the front, and forming the overlapping extending portion with the rear glass member on the rear side.

The side members, the front glass member, the rear glass member, and the roof member may each be formed with a closed curve.

The vehicle body may further include a cowl member formed of a linear member forming the overlapping extending portion with the front glass member on an upper side and forming the overlapping extending portion with the side member on a rear side.

The cowl member may be formed with a closed curve.

The vehicle body may further include a floor under member formed of a linear member extending in a front-rear direction of the vehicle body on a lower side of the cowl member, and a vertical support member installed on an upper side of the floor under member to support the cowl member from a lower side.

A suspension mounting portion may be provided between a lower portion of the cowl member and an upper portion of the vertical support member.

The vehicle body may further include a back member formed of a linear member forming the overlapping extending portion with the rear glass member on the upper side and forming the overlapping extending portion with the side member at the front.

The back member may be formed with a closed curve.

DETAILED DESCRIPTION OF ILLUSTRATIVE EMBODIMENTS

Figure 1:
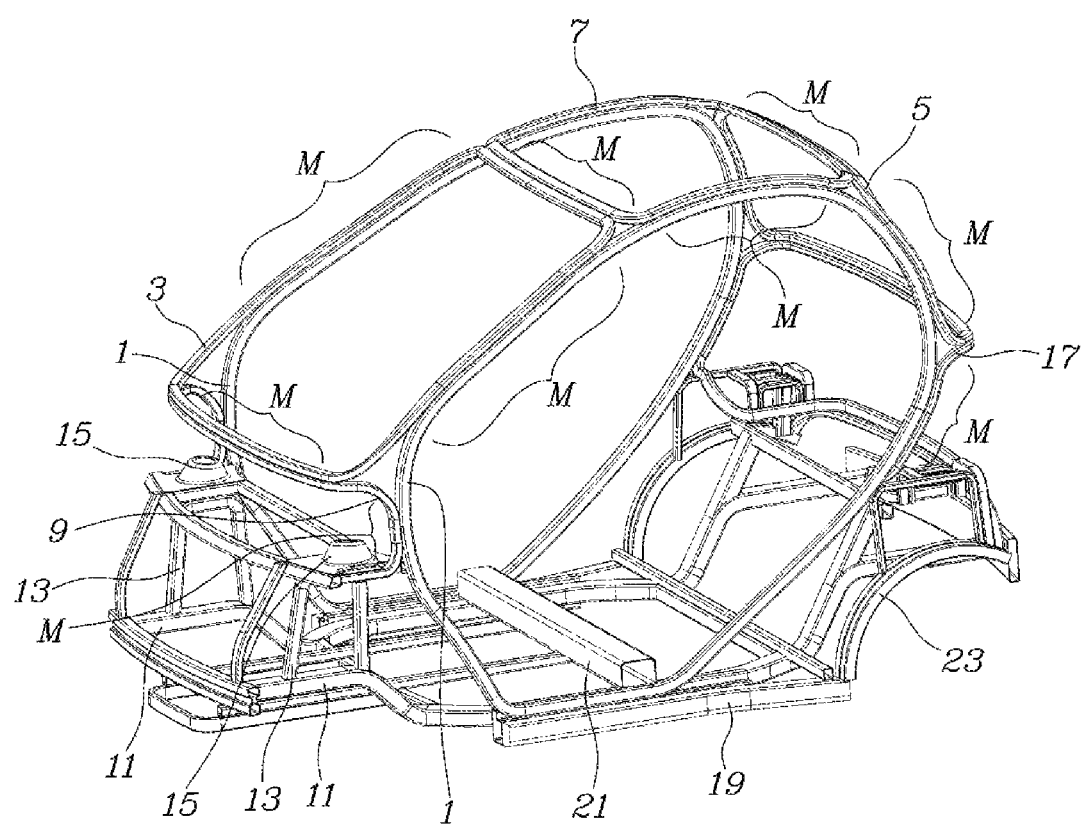
FIG. 1 is a view illustrating a vehicle body structure according to embodiments of the present disclosure.
Figure 2:
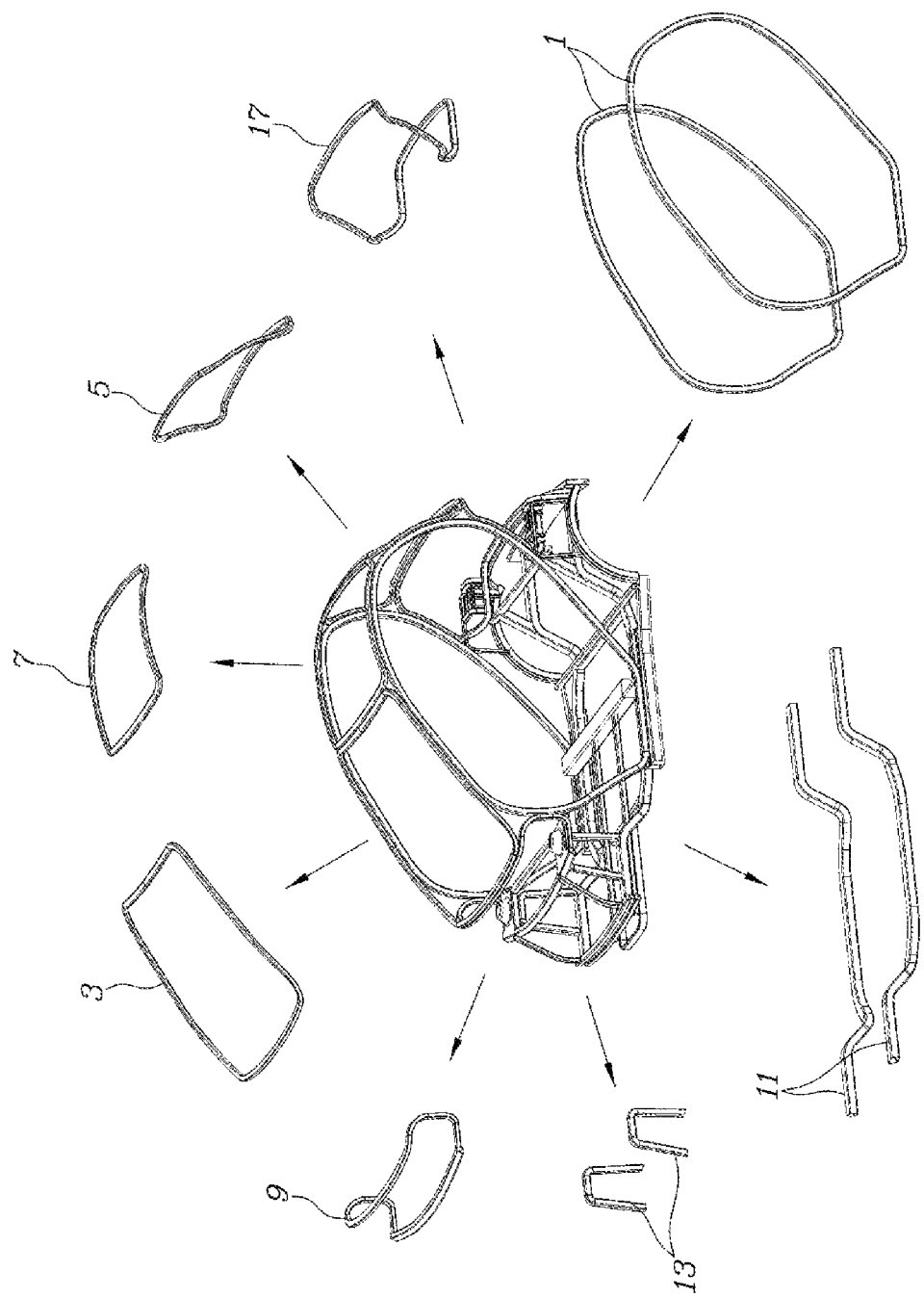
FIG. 2 is an exploded view illustrating each component of the vehicle body structure of FIG. 1.

Referring to FIGS. 1 and 2, an embodiment of a vehicle body includes side members 1 formed of linear members forming side spaces of the vehicle body, a front glass member 3 formed of a linear member forming an overlapping extending portion M with the side members 1 on both sides and forming a front windshield glass installation space, a rear glass member 5 formed of a linear member forming the overlapping extending portion M with the side members 1 on both sides and forming a rear windshield glass installation space, and a roof member 7 formed of a linear member forming the overlapping extending portion M with the side members 1 on both sides, forming the overlapping extending portion M with the front glass member 3 at the front, and forming the overlapping extending portion M with the rear glass member 5 on the rear side.

The side members 1, the front glass member 3, the rear glass member 5, and the roof member 7 each form a closed curve.

That is, in the vehicle body according to an embodiment of the present disclosure, the side members 1 forming both sides of the vehicle body, the front glass member 3 provided on a front upper side of the vehicle body between the side members 1, the rear glass member 5 provided on a rear upper side of the vehicle body, and the roof member 7 therebetween are configured as linear members each forming a closed curve and are connected to each other by fastening members of the overlapping extending portions M.

The vehicle body of an embodiment of the present disclosure further includes a cowl member 9 formed of a linear member forming the overlapping extending portion M with the front glass member 3 on an upper side and forming the overlapping extending portion M with the side member 1 on a rear side, and the cowl member 9 is a structure forming a closed curve.

In addition, the vehicle body according to an embodiment of the present disclosure may further include a floor under member 11 formed of a linear member extending in a front-rear direction of the vehicle body on a lower side of the cowl member 9, and a vertical support member 13 installed on an upper side of the floor under member 11 to support the cowl member 9 from a lower side. A suspension mounting portion 15 is provided between a lower portion of the cowl member 9 and an upper portion of the vertical support member 13.

Accordingly, a suspension may be configured by installing a shock absorber, a suspension spring, and the like, at the suspension mounting portion 15.

In addition, the vehicle body of an embodiment of the present disclosure further includes a back member 17 formed of a linear member forming the overlapping extending portion M with the rear glass member 5 on the upper side and forming the overlapping extending portion M with the side member 1 at the front, and the back member 17 is a structure forming a closed curve.

Accordingly, in the vehicle body of the present embodiment, the cowl member 9 and the back member 17, as well as the side members 1, the front glass member 3, the rear glass member 5, and the roof member 7, are formed of the linear members forming a closed curve and connected to each other and fixed through the overlapping extending portions M formed therebetween, thereby forming a frame of the vehicle body.

For reference, side sills 19 on both sides of the vehicle body of FIG. 1 are connected by a center cross member 21, and an additional member such as a rear wheel house frame 23 or the like is provided on the rear side of the side sill 19.

In the vehicle body forming structure as described above, referring to FIGS. 3 to 5, the plurality of linear members, in which bent portions are at least partially formed to form different spaces, respectively, overlap each other at least in some sections to form the overlapping extending portion M extending in the same direction, and the vehicle body frame is formed by fastening the overlapping extending portions M of the linear members by fastening members.

For example, the side members 1 are formed of linear members formed of bent portions overall to form closed curves forming the side spaces of the vehicle body and are combined with each of the front glass member 3, the rear glass member 5, the roof member 7, the cowl member 9, and the back member 17, while forming the overlapping portions M, to form the vehicle body frame.

Besides the side members 1, the front glass member 3, the rear glass member 5, the roof member 7, the cowl member 9, and the back member 17 are formed of the linear members in which bent portions are at least partially formed to form spaces, respectively, and combined with each other, while forming the overlapping extending portions M.

Figure 3:
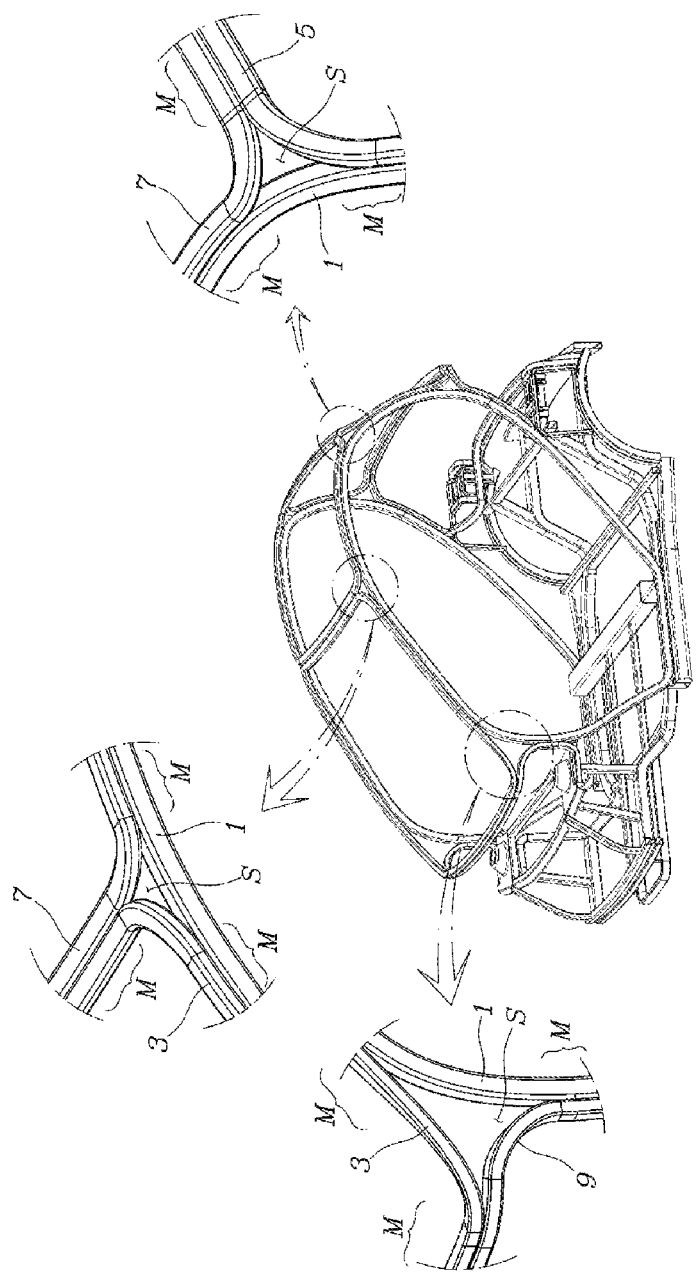
FIG. 3 is a view illustrating a vehicle body forming structure according to embodiments of the present disclosure.

Referring to FIG. 3, the vehicle body forming structure includes spatial joints S formed of spaces which are formed at a point where three or more linear members which are partially adjacent to each other do not overlap each other between the overlapping extending portions M formed therebetween.

That is, for example, the side members 1, the front glass member 3, and cowl member 9 are combined with each other to form the spatial joints S as the overlapping extending portion M formed by the side member 1 and the front glass member 3, the overlapping extending portion M formed by the front glass member 3 and the cowl member 9, and the overlapping extending portion M formed by the cowl member and the side member 1 form spaces between the three overlapping extending portions M.

Compared with the related art in which a structure such as a separate assembly bracket or the like is provided at portions where the three members are combined with each other, thereby combining the three members, in the present disclosure, the three linear members configuring the vehicle body are combined, while forming the overlapping extending portions M and the spatial joints S, without such a component as the assembly bracket.

The spatial joint S as described above is substantially not a component but a space incidentally formed as the linear members which are adjacent to each other to be combined as described above are combined, while forming the overlapping extending portions M therebetween, obtaining an advantage in that a component such as the assembly bracket or the like is not required and an advantage in that the space enhances noise vibration harshness (NVH) performance of the vehicle because the space serves as a buffer against various impacts applied from the outside.

The linear member may be formed of a hollow member 25 in which at least a portion thereof forms a closed cross-section.

Figure 4:
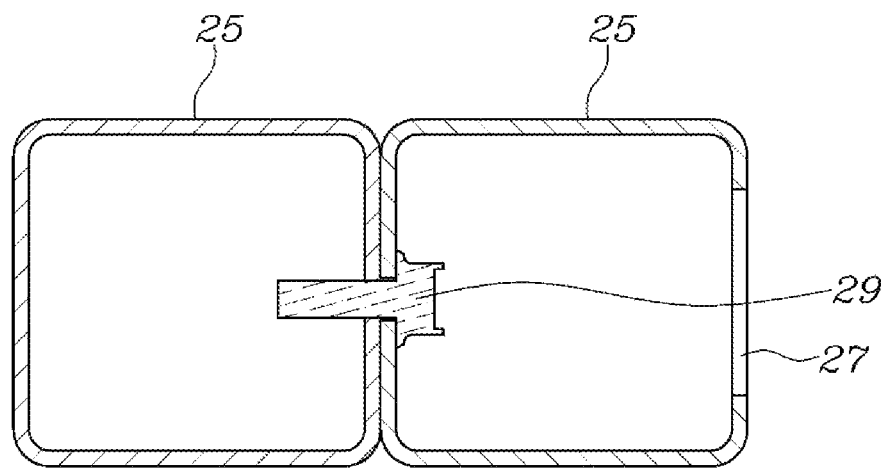
FIG. 4 is a view illustrating a state in which an overlapping extending portion formed by two hollow members is fastened by a fastening member.

Here, since the hollow member 25 substantially has a structure of a closed tube or pipe in an elongated closed cross-sectional shape as illustrated in FIG. 4 and includes a fastening hole 27 formed at a portion thereof to allow a fastening member to be inserted therethrough as described hereinafter, it is expressed that the at least a partial section forms a closed cross-section as described above.

For reference, the left side of FIG. 4 is the hollow member 25 without the fastening hole 27 and the right side thereof is the hollow member 25 having the fastening hole 27, and thus, the overlapping extending portions M are fastened by inserting a fastening member such as a screw or bolt 29 through the fastening hole 27.

In addition, the linear member may be formed of a channel member 31 having a C-shaped cross-section in which a portion of the cross-section is open.

Alternatively, as the linear members, a linear member formed of the hollow member 25 in which at least a partial section forms a closed cross-section and a linear member formed of the channel member 31 having a C-shaped cross-section with a portion thereof open may be used in combination.

That is, all the linear members configuring the vehicle body as illustrated in FIG. 3 may be configured as the hollow members 25 or may be configured as the channel members 31, and a combination thereof may also be used.

Figure 5:
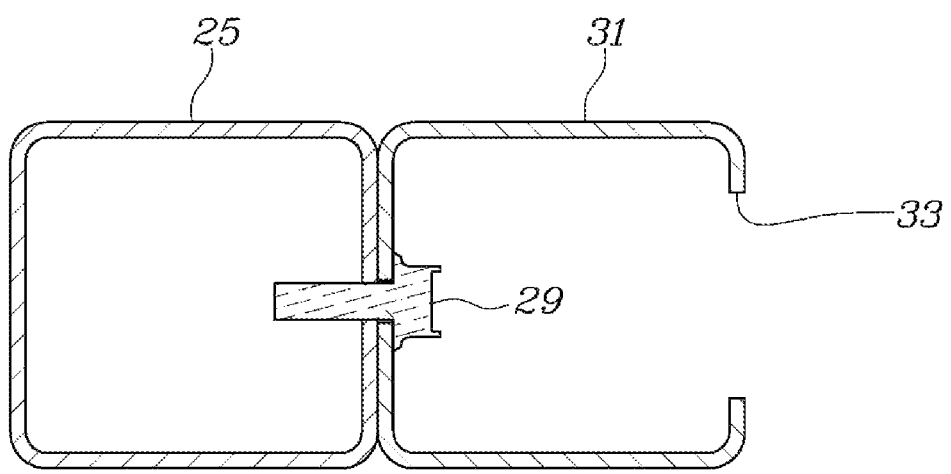
FIG. 5 is a view illustrating a state in which an overlapping extending portion formed by a hollow member and a channel member is fastened by a fastening member.

FIG. 5 illustrates a state in which the cross-sections of the hollow member 25 and the channel member 31 forming the overlapping extending portion M are fastened by a fastening member.

The fastening member includes a bolt 29 or a screw fastened through the two linear members forming the overlapping extending portion M. If the linear member is the hollow member 25, the fastening may be inserted through the fastening hole 27 formed at the hollow member 25 so as to be fastened, and if the linear member is the channel member 31, the fastening member may be inserted through an opening 33 of the channel member 31 so as to be fastened.

Of course, the fastening member may be a flow drill screw (FDS) or the like.

Meanwhile, it is more preferable that the two linear members forming the overlapping extending portion M overlap in a surface contact state with each other to advantageously ensure a coupling force of the overlapping extending portion M.

Embodiments of the present disclosure provide the vehicle body forming structure and the vehicle body which rarely need processes requiring large investments, such as pressing, welding, painting, and the like, thus ensuring relatively high productivity, while incurring a relatively low cost and saving investment cost for production, and which have such high design freedom as to be suitable for small quantity batch production, and the vehicle body.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A vehicle body forming structure, comprising:
a plurality of linear members, including a front glass member, a roof member, a rear glass member, first and second side members, and a cowl member, wherein each linear member is a closed curve, wherein each linear member includes a bent portion in at least a portion thereof, and wherein each linear member overlaps at least two other linear members in at least a partial section in parallel without intersecting to form overlapping extending portions extending in the same direction; and
a fastening member configured to fasten the overlapping extending portions to form a vehicle body frame,
wherein, for each group of (1) the cowl member, the front glass member, and the first side member, (2) the cowl member, the front glass member, and the second side member, (3) the front glass member, the roof member, and the first side member, (4) the front glass member, the roof member, and the second side member, (5) the roof member, the rear glass member, and the first side member, and (6) the roof member, the rear glass member and the second side member, a first two of the members are at least partially adjacent to each other, a second two of the members are at least partially adjacent to each other, and a third two of the members are at least partially adjacent to each other, wherein a spatial joint is formed of a space encompassed by the respective members of each group, and wherein each spatial joint is between the overlapping extending portions of the respective members of each group.

2. The vehicle body forming structure of claim 1, wherein at least one of the linear members is formed of a hollow member in which at least a partial section forms a closed cross-section.

3. The vehicle body forming structure of claim 1, wherein at least one of the linear members is formed of a channel member having a C-shaped cross-section in which a portion is open.

4. The vehicle body forming structure of claim 1, wherein at least one of the linear members includes a hollow member in which at least a partial section forms a closed cross-section, at least another one of the linear members includes a channel member having a C-shaped cross-section in which a portion is open, and the hollow member and the channel member are configured to be used in combination.

5. The vehicle body forming structure of claim 4, wherein:
the fastening member includes a bolt or a screw fastened through two linear members forming one of the overlapping extending portions, and
when the linear member is the hollow member, the fastening member is configured to be inserted through a fastening hole formed at the hollow member.

6. The vehicle body forming structure of claim 5, wherein:
the fastening member includes a bolt or a screw fastened through two linear members forming one of the overlapping extending portions, and
when the linear member is the channel member, the fastening member is configured to be inserted through an opening in the channel member.

7. A vehicle body comprising:
first and second side members formed of linear members forming side spaces of the vehicle body;
a front glass member formed of a linear member forming, in parallel without intersecting, an overlapping extending portion with the side members on both sides of the vehicle body and forming a front windshield glass installation space;
a rear glass member formed of a linear member forming, in parallel without intersecting, an overlapping extending portion with the side members on both sides of the vehicle body and forming a rear windshield glass installation space;
a cowl member formed of a linear member forming, in parallel without intersecting, an overlapping extending portion with the front glass member on an upper side of the cowl member and forming, in parallel without intersecting, an overlapping extending portion with each side member on a rear side of the cowl member; and
a roof member formed of a linear member forming, in parallel without intersecting, an overlapping extending portion with the side members on both sides of the vehicle body, forming, in parallel without intersecting, an overlapping extending portion with the front glass member at a front end of the vehicle body, and forming, in parallel without intersecting, an overlapping extending portion with the rear glass member on a rear end of the vehicle body, wherein the side members, the front glass member, the rear glass member, the cowl member, and the roof member are each formed with a closed curve, and wherein each group of (1) the cowl member, the front glass member, and the first side member, (2) the cowl member, the front glass member, and the second side member, (3) the front glass member, the roof member, and the first side member, (4) the front glass member, the roof member, and the second side member, (5) the roof member, the rear glass member, and the first side member, and (6) the roof member, the rear glass member and the second side member, has a spatial joint formed of a space encompassed by the respective members of each group, and wherein each spatial joint is between the overlapping extending portions of the respective members of each group.

8. The vehicle body of claim 7, further comprising:
a floor under member formed of a linear member extending in a front-rear direction of the vehicle body on a lower side of the cowl member; and
a vertical support member installed on an upper side of the floor under member to support the cowl member from the lower side.

9. A vehicle body comprising:
side members formed of linear members forming side spaces of the vehicle body;
a front glass member formed of a linear member forming an overlapping extending portion with the side members on both sides of the vehicle body and forming a front windshield glass installation space;
a rear glass member formed of a linear member forming the overlapping extending portion with the side members on both sides of the vehicle body and forming a rear windshield glass installation space;
a roof member formed of a linear member forming the overlapping extending portion with the side members on both sides of the vehicle body, forming the overlapping extending portion with the front glass member at a front end of the vehicle body, and forming the overlapping extending portion with the rear glass member on a rear end of the vehicle body;
a cowl member formed of a linear member forming the overlapping extending portion with the front glass member on an upper side of the cowl member and forming the overlapping extending portion with the side members on a rear side of the cowl member;
a floor under member formed of a linear member extending in a front-rear direction of the vehicle body on a lower side of the cowl member;
a vertical support member installed on an upper side of the floor under member to support the cowl member from the lower side; and
a suspension mounting portion disposed between a lower portion of the cowl member and an upper portion of the vertical support member.

10. The vehicle body of claim 7, further comprising:
a back member formed of a linear member forming the overlapping extending portion with the rear glass member on an upper side of the back member and forming second overlapping extending portions with the side members at a front side of the back member.

11. The vehicle body of claim 10, wherein the back member is formed with a closed curve.

* * * * *